Patented Nov. 4, 1941

2,261,473

UNITED STATES PATENT OFFICE 2,261,473

TEMPERATURE INDICATOR

George W. Jennings, Chicago, Ill.

No Drawing. Application April 16, 1938
Serial No. 202,583

7 Claims. (Cl. 252—379)

My invention relates to mixtures which are sensitive to changes in temperature and more particularly to new and improved mixtures of this type employing organic dyes or pigments whereby to effect changes of color over a wide range of temperatures.

Broadly, an object of my invention is to provide mixtures of this type which will indicate clearly changes of temperature of objects to which they are applied, the change in temperature being shown by a change in color of the mixture. An application may be in the form of an ink printed upon a surface, a paint for coating a surface, a small bulk of the mixture in a container attached to the object or made part of the object whose change in temperature it is desired to ascertain, or in other form suitable for the intended purpose.

The customary methods of ascertaining temperatures by means of thermometers, thermocouples and the like, may be accurate and in many cases convenient but in certain cases are not feasible due to cost of thermometers and thermocouples, their fragility, their size, inconvenient use, and other considerations. For many purposes, a change of temperature only is desired to be ascertained, usually at some critical point or points, the exact temperature over a considerable range not being of importance. For many purposes, a means of noting a temperature easily and without peering at difficult-to-read thermometers, frequently in more or less inaccessible places, is desired.

Certain uses for temperature-sensitive mixtures which will change their color with a change in temperature will be found in distilling operations where such a mixture applied to a section of apparatus would show by its color whether or not liquid or vapor at a certain temperature were flowing. For example, a vapor delivery pipe treated with one of these mixtures would show a certain color when no distillation were in progress but would show a different color as soon as the vapor began to pass through the pipe and would continue to show this latter color until distillation were discontinued, whereupon reversion to the original color would take place. Another use will be found in the refrigerating industry where such a change of color could be used to indicate the flow of the refrigerating liquid through a line and also whether the liquid were between a certain minimum and a certain maximum temperature. Another use will be in the beverage industry where such mixtures applied to bottles would indicate whether the bottles were within certain desired minimum and maximum temperature limits which were best for potability. This use would be indicated particularly in the case of beer, the potability of which is affected especially by temperature.

An object of my invention, therefore, is to provide mixtures of the aforesaid character which will indicate such changes in temperature clearly and obviously, which may readily be seen by an observer and at a distance if necessary, which will be relatively inexpensive and which may be used in situations where it would be practically impossible to use the customary temperature-indicating instrument.

More specifically, the invention is preferably directed to the use of mixtures employing organic dyes or pigments which will produce changes of color in the mixtures when subjected to a change in temperature. Organic dyes or pigments are preferably contemplated because they possess a remarkable ability in certain mixtures to produce the result desired and to cover an exceptionally wide range of temperature change in their action of changing color. It will be noted that this exceptionally wide range of temperature change covered by mixtures containing organic dyes or pigments includes a greater range of temperature than heretofore possible by temperature indicators of the type adapted to effect a color change upon a critical temperature change. Many other advantages in the use of organic dyes or pigments capable of changing color in mixtures to indicate critical temperature changes will be apparent to those skilled in the art, including the wide range of possible mixtures, and the ease to which these organic dyes and pigments lend themselves in providing such wide range of mixtures in which the dyes and pigments readily undergo color changes when subjected to their critical temperature changes.

Broadly the invention contemplates using organic dyes or pigments in mixtures of various types. An outstanding advantage is the ability of the organic dye or pigment in the mixture to change the color of the mixture at a critical temperature change. To this end, the mixture may in certain instances comprise only the organic dye or pigment and a binder. In one case, the pigment may be bronze orange which normally appears orange in color but when subjected to a specific temperature turns red. Specifically, bronze orange is representative of a class of organic dyes or pigments formed from ortho chlor para toluidine mixed with beta naphthol. Representative of another class of organic dyes or pigments that, when used in accordance with the teachings of this invention, will change the color of its mixture upon a predetermined temperature change, is permatone orange formed from ortho dinitraniline mixed with beta naphthol. In each of these given instances, the mixture may include at least one of these organic dyes or pigments and a suitable carrier or binder. The character or type of carrier or binder will depend upon the organic dye or pigment and the use to which the mixture may be put, but examples of such carriers or binders are suitable oils, varnishes, etc.

The examples so far cited are of organic compounds (dyes or pigments) which in themselves show a change in color with a change in temperature, the exact mechanism of the color change being unknown but believed to be due to an internal molecular rearrangement involving, in most cases, a double bond linking together certain component parts of the compound. Elevation or depression of the temperature to which the compound is subjected causes an increase or decrease, as the case may be, in the rate of vibration or activity of the forces holding the atoms together in the molecule. This change in activity when reaching a certain point may allow or force certain of the atoms into a slightly different arrangement, which in turn imparts a different color to the compound. This explanation of the cause of the color change of this class of compounds is my present belief. Although it may or may not be strictly true, I do not wish the invention to be limited in any way by this explanation of the phenomena observed.

I have found that a very extended and almost unlimited range of critical temperature changes may be indicated through the use of mixtures including a solvent for the dye or pigment, which will have a melting point at the critical temperature it is desired to indicate, and which solvent at its melting point will react with the dye or pigment to change the color of the mixture. In such instances, the solvent to be selected will be one that will have a melting point at the critical temperature and will react at this melting point with the dye or pigment in the mixture to cause a change of color of the mixture. Such solvents may be a compound which is capable of changing the color of the dye or pigment when subjected to the suitable conditions stated. These conditions may be satisfied by a change in the state of the compound, under the influence of a change in temperature, as from liquid to solid or from solid to liquid.

Solvents of the type included herein may be acidic or basic substances whether organic or inorganic. Organic acids may be fatty acids such for example as caproic, oleic, stearic, etc., and organic bases may be for example amines, imines, etc. The selection of the acidic or basic substance to be used will be determined by the melting point and its correspondence to the critical temperature it is desired to indicate. Organic and inorganic acidic and basic compounds in general when melting from a solid to a liquid state, or solidifying from a liquid to a solid will undergo a change in hydrogen ion concentration, commonly called pH value. I have discovered in this connection that when a dye or compound capable of having its color altered by this change in pH value is present, a change in color of the mixture accompanies this change in state. Consequently, the color of the mixture is changed by a change in temperature. As the melting or solidifying points of compounds of an acidic or basic nature cover a very wide range of temperature, mixtures may be employed which will exhibit a color change at almost any desired point within this wide range. Hence, it will be understood that any suitable acidic or basic substance may be used whether organic or inorganic, the selection depending upon the melting point, the change of pH value, and the ability of the dye or compound used to change or alter its color by this change in pH value.

Dyes, pigments or compounds that may be used will be determined, as stated, by their ability to change or alter their color by the change in pH value of the acidic or basic solvent, and consequently, the invention is not to be limited to the examples given. Such examples are iodeosine, tetrabromophenolsulfonphthalein, thymosulfonphthalein, and certain members of the following classes of compounds: nitro compounds, mono-azo compounds, dis-azo compounds, triphenylmethanes, phthaleins and related compounds, sulfonphthaleins, indophenols, azines, anthraquinones and others. Specific examples of suitable mixtures of fatty acids and organic dyes or pigments are caproic acid and iodeosine, stearic acid and tetrabromophenolsulfonphthalein, and oleic acid and thymolsulfonphthalein.

In many cases, it may be desirable to add a third component to the mixture to act as a vehicle or as a binding agent for the active components. In this connection, it is to be noted particularly that for some applications, the vehicle may be water but this is not necessary and for many applications is not even desirable because of the relatively narrow temperature limits, 0° to 100° C., imposed by the water, its volatility, and other characteristics. The vehicle suitable may be a drying oil, or other oil, which may be mixed with resins, or it may be of colloidal nature, such as a gelatine, agar, etc., or it may be water soluble or water insoluble, or of any other nature suitable for the application intended.

All organic and inorganic acidic and basic substances having a change in pH value, when changing from a solid to a liquid or from a liquid to a solid, capable of causing the dye or pigment to change the color of the mixture may not necessarily be a solvent of the dye or pigment that it is desirable to use in the mixture. In such cases, a mutual solvent may be included in the mixture. Hence, if an acidic or basic substance exists that undergoes a change in its state at a temperature it is desired to indicate, it may be advantageously used, although not a solvent of the dye or pigment, through the use of a mutual solvent.

It may be desirable to give better contrast or more pleasing colors to the mixture than the color produced by the active organic substance (dye or pigment) in the mixture when subjected to critical temperatures, and to this end additional inert organic dyes or pigments may be incorporated in the mixture for imparting these desirable colors or contrast in colors to the mixtures. In other words, an organic substance in the mixture suitable to effect a color change at some desired range of temperature that may be needed for a given application of the invention, may have a color that is not sufficiently contrasty or desirable for the particular purpose. Hence, an inert dye or pigment may be additionally incorporated to modify the colors of the active organic dye or pigment.

Other examples of organic dyes or pigment substances that may be used in a mixture with a binder or vehicle, as in the example of bronze orange or permatone orange, may be certain members of such classes as thio-semicarbazones, benzohydrylidene-anthrone, dixanthylene, thioketones, benzo-y-pyrones and glyoxalines.

A mixture of an organic dye or pigment and a binder, which may be used in the form of an ink or a paint for purposes similar to the examples given, may consist of:

| | Per cent |
|---|---|
| Lithographic varnish | 25 to 75 |
| Titanium dioxide | 0 to 65 |
| "Bronze orange" | 10 to 25 |
| Drier | 0.01 to 0.10 |

This mixture changes color from orange to red at temperatures around 90° centigrade.

A mixture of an organic dye or substance and a solvent, which mixture may be used in bulk, or as an impregnating agent or as a coating protected by a transparent sheet, may consist of:

| | Per cent |
|---|---|
| Caproic acid | 98 |
| Iodeosine | 2 |

This mixture changes color from bright red to tan at temperatures around 8° centigrade.

Another mixture of the same class may consist of:

| | Per cent |
|---|---|
| Stearic acid | 75.00 |
| Diethyleneglycolmonoethylether | 24.95 |
| Tetrabromophenolsulfonphthalein | 0.05 |

This mixture changes color from pale yellow to purple at temperatures around 55° centigrade.

In mixtures containing compounds of the first class, the temperature at which a change of color occurs may be governed by proper selection of the dye or pigment. In mixtures containing compounds of the second class, the temperature at which a change of color occurs may be governed by proper selection of the acidic or basic compound and the color change governed by the dye selected.

It will be understood that the use of a mixture employing an organic dye or pigment, whether with a binder, vehicle or solvent, will admit of a reversibility of color change of the mixture when the state thereof is changed back to normal, as from a liquid to a solid or a solid to a liquid. The color change effected at the critical temperature to be indicated is advantageously not made permanent but the mixture will be capable of returning to its original color when the critical temperature again disappears.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A solid composition which undergoes a reversible change in color at a predetermined temperature, which comprises a mixture of a fusible ionizable organic substance which exhibits a change in hydrogen-ion concentration at the melting point thereof, and an organic indicator which is soluble in said fusible substance and which undergoes a reversible change in color at a hydrogen-ion concentration substantially equal to that of said fusible substance at the melting point thereof, said composition being capable of undergoing a color change when said fusible substance passes from a solid to a molten state, and substantially resuming its original color when said fusible substance passes from the molten to a solid state.

2. A solid composition which undergoes a reversible change in color at a predetermined temperature, which comprises a mixture of a fusible ionizable organic substance which exhibits a change in hydrogen-ion concentration at the melting point thereof, an organic indicator, in intimate admixture with said fusible substance, which undergoes a reversible change in color at a hydrogen-ion concentration substantially equal to that of said fusible substance at the melting point thereof, and a mutual solvent for said fusible substance and said indicator, said composition being capable of undergoing a color change when said fusible substance passes from a solid to a molten state, and substantially resuming its original color when said fusible substance passes from a molten to a solid state.

3. The composition of claim 1 wherein said fusible substance comprises an organic carboxylic acid.

4. The composition of claim 1 wherein said fusible substance comprises a fusible organic acid.

5. The composition of claim 1 wherein said fusible substance comprises a fusible organic base.

6. A solid composition for indicating temperature changes comprising a mixture of a fusible ionizable organic substance which exhibits an increase in its hydrogen-ion concentration when passing from the solid to the molten state, and a second substance soluble in said fusible substance, indicative, by reversible color change, of the hydrogen-ion concentration of said fusible substance, said composition being subject to a reversible color change when said fusible substance passes from the solid to the molten state and substantially resuming its original color when said fusible substance passes from the molten to the solid state.

7. A solid composition for indicating temperature changes comprising a mixture of a fusible ionizable organic substance which exhibits a decrease in hydrogen-ion concentration when passing from the solid to the molten state, and a second substance soluble in said fusible substance, indicative, by reversible color change, of the hydrogen-ion concentration of said fusible substance, said composition being subject to a reversible change in its color when said fusible substance passes from the solid to the molten state and substantially resuming its original color when said fusible substance passes from the molten to the solid state.

GEORGE W. JENNINGS.